US008861235B2

(12) United States Patent
Azuma et al.

(10) Patent No.: US 8,861,235 B2
(45) Date of Patent: *Oct. 14, 2014

(54) POWER CONVERTING APPARATUS

(75) Inventors: Satoshi Azuma, Tokyo (JP); Takeshi Oi, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 13/382,707

(22) PCT Filed: May 7, 2010

(86) PCT No.: PCT/JP2010/003126
§ 371 (c)(1),
(2), (4) Date: Jan. 6, 2012

(87) PCT Pub. No.: WO2011/033698
PCT Pub. Date: Mar. 24, 2011

(65) Prior Publication Data
US 2012/0099353 A1 Apr. 26, 2012

(30) Foreign Application Priority Data

Sep. 16, 2009 (JP) ................................. 2009-214411

(51) Int. Cl.
H02M 7/48 (2006.01)
H02M 7/49 (2007.01)
(52) U.S. Cl.
CPC .............. *H02M 7/49* (2013.01); *Y02B 70/1483* (2013.01)
USPC .......................................................... 363/71
(58) Field of Classification Search
CPC .................................. H02M 7/48; H02M 7/49
USPC .............................. 363/65, 71, 72; 307/58, 82
See application file for complete search history.

(56) References Cited

U.S. PATENT DOCUMENTS 7,602,626 B2   10/2009   Iwata et al.
2007/0194627 A1*  8/2007  Mori et al. .................... 307/103
(Continued)

FOREIGN PATENT DOCUMENTS

JP      2009 165222      7/2009
JP      2009165222    *  7/2009
(Continued)

OTHER PUBLICATIONS

Japanese Office Action issued Jun. 18, 2013, in Japan Patent Application No. 2011-531762 (with Partial English translation).

(Continued)

*Primary Examiner* — Gary L Laxton
*Assistant Examiner* — Kyle J Moody
(74) *Attorney, Agent, or Firm* — Oblon, Spivak, McClelland, Maier & Neustadt, L.L.P.

(57) ABSTRACT

A power converting apparatus includes a main inverter having a high-voltage DC power supply that operates at a low frequency employing SiC MOSFETs having a high withstand voltage exceeding 600 V and a sub-inverter having a low-voltage capacitor that operates through high-frequency PWM employing Si MOSFETs having a low withstand voltage. With AC sides of the main inverter and the sub-inverter connected in series, the power converting apparatus outputs AC power having a prescribed voltage waveform by adding voltages individually generated by the main inverter and the sub-inverter. Specifically, the SiC MOSFETs are used only in the main inverter of which devices are required to have a high withstand voltage and the Si MOSFETs are used in the sub-inverter of which devices may have a relatively low withstand voltage, whereby conduction loss is reduced with an inexpensive circuit configuration.

14 Claims, 9 Drawing Sheets

(56) References Cited

U.S. PATENT DOCUMENTS

2009/0168471 A1* 7/2009 Tsugawa et al. ............ 363/56.01
2010/0309700 A1 12/2010 Maeda et al.
2011/0089765 A1* 4/2011 Iwata et al. ..................... 307/82

FOREIGN PATENT DOCUMENTS

| JP | 2009 183115 | 8/2009 |
|---|---|---|
| WO | 00 72433 | 11/2000 |
| WO | 2006 090674 | 8/2006 |
| WO | 2009 116273 | 9/2009 |

OTHER PUBLICATIONS

International Search Report Issued Jul. 13, 2010 in PCT/JP10/03126 Filed May 7, 2010.

Combined Office Action and Search Report issued Jan. 15, 2014 in Chinese Patent Application No. 201080035951.2 with partial English language translation and English Translation of Category of Cited Documents.

Office Action issued Mar. 17, 2014 in German Patent Application No. 11 2010 003 664.0 (with English language translation).

Haiwen Liu, et al., "Comparison of fundamental frequency and PWM methods applied on a hybrid cascaded multilevel inverter", IECON 2008, 34$^{th}$ Annual Conference of IEEE Industrial Electronics, 2008, pp. 3233-3237.

Burak Ozpineci, et al., "Effects of silicon carbide (SiC) power devices on HEV PWM inverter losses", IECON '01, The 27$^{th}$ Annual Conference of the IEEE Industrial Electronics Society, vol. 2, 2001, pp. 1061-1066.

Keith A. Corzine, et al., "Control of cascaded multilevel inverters", IEEE Transactions on Power Electronics, vol. 19, No. 3, May 2004, pp. 732-738.

* cited by examiner

HIGH-FREQUENCY PWM

POWER CONVERTING APPARATUS

TECHNICAL FIELD

The present invention relates to a power converting apparatus and, in particular, to an inverter which can be used for controlling large electric power with reduced power loss.

BACKGROUND ART

As an example of a conventional inverter circuit, there exists a below-described switching circuit which is usable for controlling large electric power with reduced power loss.

This switching circuit includes a series circuit configured with a silicon (Si) transistor and a non-Si transistor which are connected in series, wherein the Si transistor has a conversion capability of 0.1 kVA to 200 kVA and the non-Si transistor is made up of a silicon carbide (SiC) or gallium nitride (GaN) power semiconductor element. Such a series connection of the two transistors serves to improve withstand voltage of the entirety of the series circuit, and high-speed operation of the non-Si transistor makes it possible to reduce switching loss of the entirety of the series circuit. (Refer to Patent Document 1, for example.)

PRIOR ART DOCUMENT

Patent Document

Patent Document 1: International patent application republication No. WO00/72433

SUMMARY OF THE INVENTION

Problems to be Solved by the Invention

The conventional inverter circuit provides a higher withstand voltage and a reduced switching loss by connecting the Si transistor and the non-Si transistor in series. The use of the series circuit results in an increase in conduction loss of the entirety of a power converting apparatus, making it difficult to improve conversion efficiency thereof, however. In addition, because output voltages of individual phases are limited to two-level voltages including a positive-side bus line voltage and a negative-side bus line voltage, there has been a problem that harmonic components contained in the output voltages would become greater, resulting in the need for a large-capacity output filter.

The present invention has been made to solve the aforementioned problems. Accordingly, it is an object of the invention to obtain a highly efficient power converting apparatus which is usable in high power control applications with a capability to reliably reduce power loss and suppress harmonic components of output voltages.

Means for Solving the Problems

A power converting apparatus according to the present invention is provided with a first inverter circuit including a first DC voltage source and a plurality of non-silicon semiconductor devices, and a second inverter circuit including a second DC voltage source having a lower voltage than the first DC voltage source and a plurality of semiconductor devices. AC-side output terminals of the first inverter circuit and AC-side output terminals of the second inverter circuit are connected in series and the power converting apparatus supplies AC power having a prescribed voltage waveform obtained by combining outputs of the first and second inverter circuits to a load.

Advantageous Effects of the Invention

The power converting apparatus of this invention is configured such that the first inverter circuit employing the plurality of non-silicon semiconductor devices is operated at a high voltage, the second inverter circuit is operated at a low voltage, and the outputs of the first and second inverter circuits are combined. For this reason, conduction loss of the entire power converting apparatus is significantly reduced, making it possible to achieve a reduction in power loss with high reliability and output large electric power with harmonic components contained in an output voltage suppressed. This eliminates the need for a large-capacity output filter, making it possible to obtain a compact, highly efficient power converting apparatus which is usable in high power control applications.

MODES OF CARRYING OUT TEE INVENTION

First Embodiment

A first embodiment of the present invention is described below with reference to the drawings.

Figure 1:
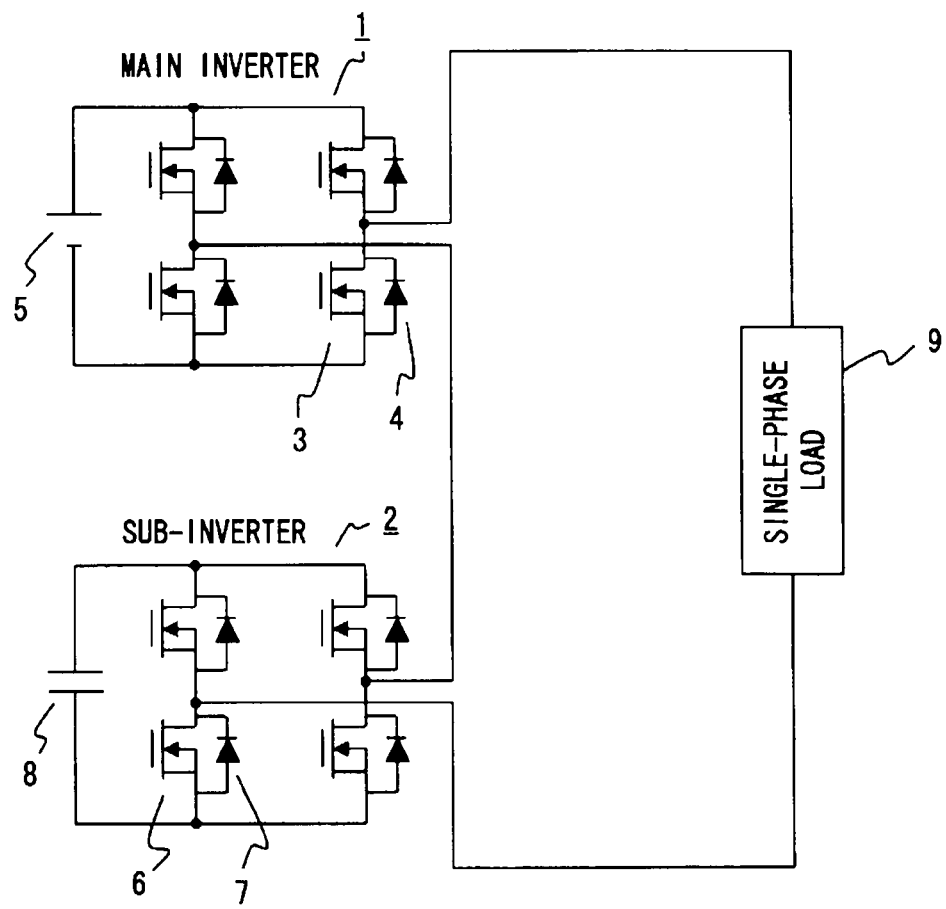
FIG. 1 is a diagram depicting the configuration of a power converting apparatus according to a first embodiment of this invention.

FIG. 1 is a diagram depicting the configuration of a power converting apparatus according to the first embodiment of this invention.

As illustrated in FIG. 1, the power converting apparatus includes a main inverter (first inverter circuit) made up of a first single-phase inverter 1 and a sub-inverter (second inverter circuit) made up of a second single-phase inverter 2 to supply AC power to a single-phase load 9.

Used in the first single-phase inverter 1 are such devices that are made of SiC or GaN, for example, which are non-Si wideband gap semiconductor materials having wider band gaps than silicon. In this case, the first single-phase inverter 1 includes SiC MOSFETs 3 serving as a plurality of non-Si power semiconductor switching devices with which SiC Schottky barrier diodes (SiC SBDs) 4 are individually connected in reverse parallel and a DC power supply 5 serving as a first DC voltage source. The first single-phase inverter 1 thus configured converts DC power fed from the DC power supply 5 into AC power and outputs the latter. This first single-phase inverter 1 works as an energy source for the single-phase load 9.

Used in the second single-phase inverter 2 are devices made of silicon, for example. In this case, the second single-phase inverter 2 includes Si MOSFETs 6 serving as a plurality of Si power semiconductor switching devices with which Si diodes 7 are individually connected in reverse parallel and a capacitor 8 serving as a second DC voltage source. The second single-phase inverter 2 thus configured converts DC power fed from the capacitor 8 into AC power and outputs the latter. Since a DC input portion is provided with the capacitor 8 alone in this case, the second single-phase inverter 2 is controlled such that the amounts of electricity charged into and discharged from the capacitor 8 are balanced, or such that an average power burden born by the second single-phase inverter 2 becomes zero.

Figure 2:
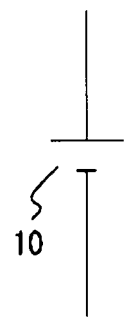
FIG. 2 is a diagram depicting an alternative of a second DC voltage source according to the first embodiment of this invention.

It is to be noted that the DC power supply 10 depicted in FIG. 2 may be used as the second DC voltage source, in which case the second single-phase inverter 2 also works as an energy source for the single-phase load 9.

Voltage Vdc-main of the DC power supply 5 of the first single-phase inverter 1 is a high voltage exceeding 600 V, for example, and this voltage is set higher than voltage Vdc-sub of the capacitor 8 of the second single-phase inverter 2.

Each of the first and second single-phase inverters 1, 2 can generate as outputs thereof positive, negative and zero voltages. The power converting apparatus is configured with AC-side output terminals of the first single-phase inverter 1 and AC-side output terminals of the second single-phase inverter 2 connected in series. The voltages generated by the individual single-phase inverters 1, 2 are combined and AC power having a prescribed voltage waveform obtained as the sum of these voltages is supplied to the single-phase load 9.

Specifically, the voltage Vdc-main of the DC power supply 5 and the voltage Vdc-sub of the capacitor 8 are set to satisfy:

Vdc-main>Vdc-sub

Vdc-main+Vdc-sub≥maximum load voltage

The working of the first and second single-phase inverters 1, 2 and the entirety of the power converting apparatus is now described below.

Figure 3:
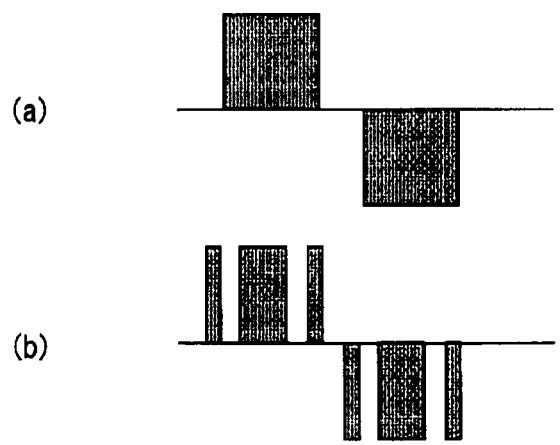
FIG. 3 is a waveform diagram representing output voltages of a first single-phase inverter according to the first embodiment of this invention.
Figure 4:
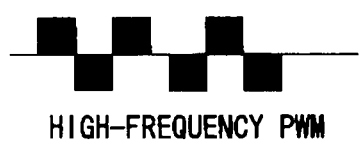
FIG. 4 is a waveform diagram representing an output voltage of a second single-phase inverter according to the first embodiment of this invention.

FIG. 3 is a waveform diagram representing output voltages of the first single-phase inverter 1. FIGS. 3(a) and 3(b) present two kinds of output voltages of the first single-phase inverter 1, FIG. 3(a) representing a case where the first single-phase inverter 1 outputs one pulse per half cycle and FIG. 3(b) depicting a case where the first single-phase inverter 1 outputs three pulses per half cycle. FIG. 4 is a waveform diagram depicting an output voltage of the second single-phase inverter 2.

As depicted in the Figures, the first single-phase inverter 1 employing the SiC MOSFETs 3 outputs a voltage waveform containing about one pulse to a few pulses each half cycle. This means that the first single-phase inverter 1 operates by low-frequency switching. On the other hand, the second single-phase inverter 2 employing the Si MOSFETs 6 operates by switching through high-frequency pulse-width modulation (PWM).

Figure 5:
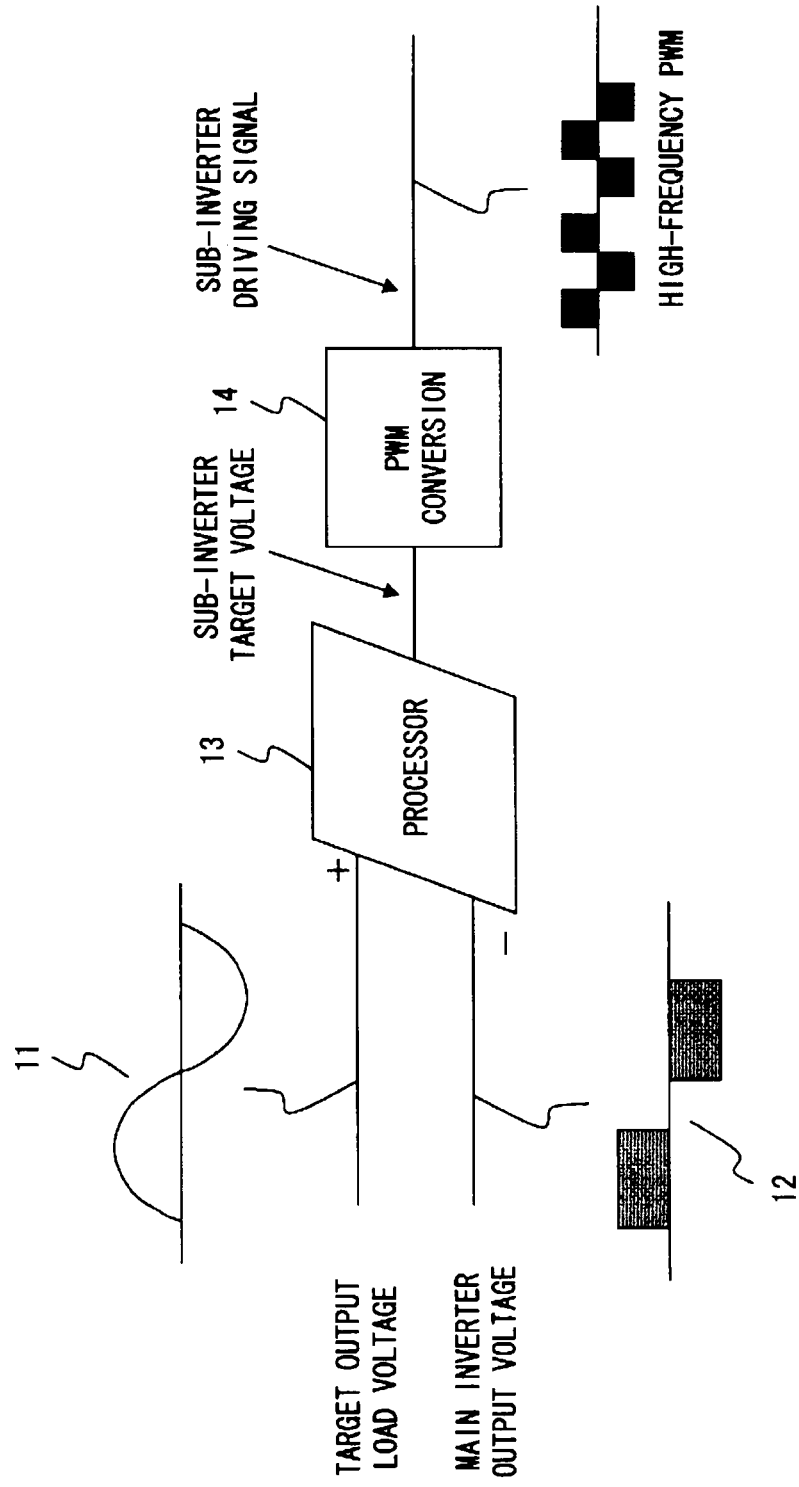
FIG. 5 is a diagram representing the working of the entirety of the power converting apparatus according to the first embodiment of this invention.

FIG. 5 represents the working of the entirety of the power converting apparatus.

As depicted in FIG. 5, the power converting apparatus calculates the value of a differential voltage obtained by subtracting an output voltage 12 (main inverter output voltage) of the first single-phase inverter 1 from a target output load voltage 11 of the entirety of the power converting apparatus by a processor 13. The power converting apparatus then generates a PWM signal (sub-inverter driving signal) for driving the second single-phase inverter 2 through PWM conversion performed by a PWM circuit 14 using the differential voltage value as a target output voltage (sub-inverter target voltage) of the second single-phase inverter 2.

In order to balance the amounts of electricity charged into and discharged from the capacitor 8 of the second single-phase inverter 2 at this time, the output of the first single-phase inverter 1 is controlled in such a manner that the power burden born by the second single-phase inverter 2 per cycle becomes zero.

It is to be noted that what is subtracted from the target output load voltage 11 of the entirety of the power converting apparatus may be a target output voltage of the first single-phase inverter 1 instead of the output voltage 12 of the first single-phase inverter 1.

Given below is a detailed discussion on power loss that occurs in the power converting apparatus thus configured associated with a description of properties of the SiC MOSFETs used in the first single-phase inverter 1 and the Si MOSFETs used in the second single-phase inverter 2.

Figure 6:
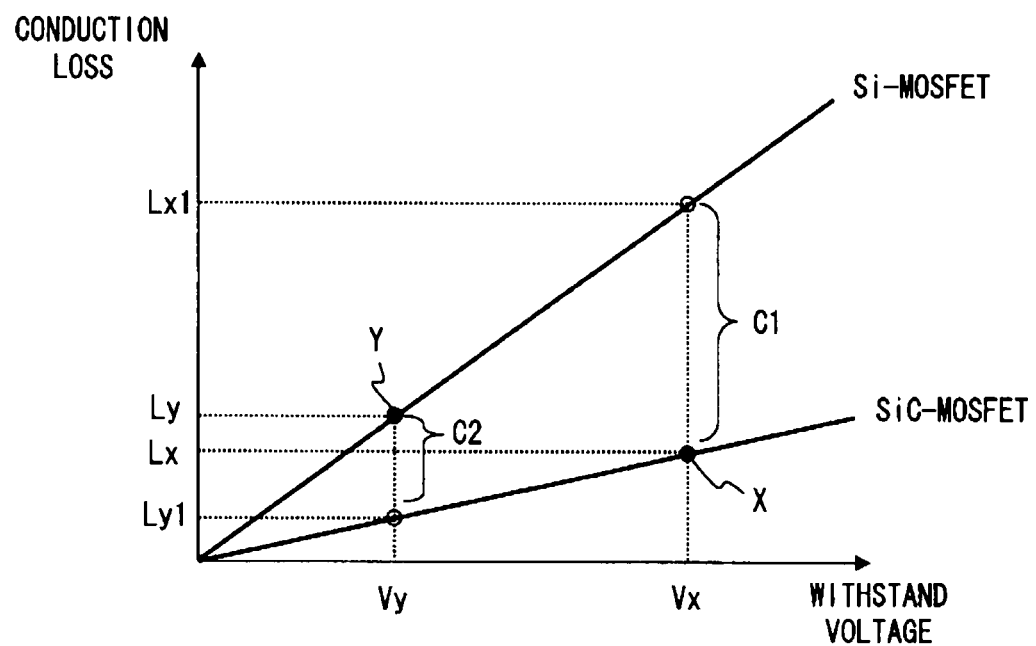
FIG. 6 is a diagram representing properties of a silicon carbide metal oxide semiconductor field effect transistor (SiC MOSFET) and a silicon metal oxide semiconductor field effect transistor (Si MOSFET) according to the first embodiment of this invention.

FIG. 6 is a diagram depicting the device properties of the SiC MOSFETs and the Si MOSFETs, representing in particular a relationship between withstand voltage and conduction loss of each device.

Generally, a SiC material which is a non-Si material having wider band gaps than Si has such an excellent property that dielectric withstand voltage thereof is so high that the specific on-resistance of a SiC MOSFET takes a small value that is a few hundredths of the specific on-resistance of a Si MOSFET. For this reason, although the conduction loss of the Si MOSFET caused by the specific on-resistance thereof sharply increases if the withstand voltage is increased, the conduction loss of the SiC MOSFET is kept at a relatively low level.

Generally speaking, while a MOSFET has a small switching loss and is suited for use in an inverter which performs high-frequency switching operation, it is not preferable to implement a Si MOSFET whose conduction loss sharply increases if the withstand voltage thereof is increased in an inverter circuit configured to operate at a relatively high voltage exceeding 600 V. Rather, the Si MOSFET is suited to high-frequency switching applications by use of a circuit which operates at a voltage equal to or lower than 600 V.

On the contrary, because the conduction loss of a SiC MOSFET is kept relatively low even when the withstand voltage thereof increases beyond 600 V, the SiC MOSFET is suited for use in an inverter circuit which operates at a high voltage exceeding 600 V.

In FIG. 6, each of the SiC MOSFETs 3 used in the first single-phase inverter 1 is represented by a SiC MOSFET device X having a withstand voltage Vx and each of the Si MOSFETs 6 used in the second single-phase inverter 2 is represented by a Si MOSFET device Y having a withstand voltage Vy, wherein the withstand voltage Vx of the SiC MOSFET device X exceeds 600 V.

In this embodiment, the first single-phase inverter 1 which employs SiC MOSFET devices X (SiC MOSFETs 3) and is provided with the DC power supply 5 for supplying the voltage Vdc-main (=kVx) is operated at a low frequency. Since these SiC MOSFET devices X operate at the low frequency, switching loss takes an extremely small value. For this reason, overall loss (switching loss+conduction loss) of the SiC MOSFET devices X becomes approximately equal to conduction loss Lx.

Also, the second single-phase inverter 2 which employs Si MOSFET devices Y (Si MOSFETs 6) and is provided with the capacitor 8 for supplying the voltage Vdc-sub (=mVy) is operated at a high frequency. Since switching loss of these Si MOSFET devices Y is sufficiently small compared to conduction loss, overall loss of the Si MOSFET devices Y may also be regarded as being equal to conduction loss Ly.

Accordingly, the sum of the losses of the SiC MOSFETs 3 and the Si MOSFETs 6 equals Lx+Ly.

Here, k and m are the ratios of the inverter DC voltages to the respective withstand voltages. Generally, values from 0.5 to 0.8 are selected as k and m. Also, since the devices X and Y constitute the first and second single-phase inverters 1, 2, respectively, a voltage equal to or lower than kVx is applied to the SiC MOSFET devices X while a voltage equal to or lower than mVy is applied to the Si MOSFET devices Y.

Compared to a case where Si MOSFETs having the withstand voltage Vx are used in the first single-phase inverter 1, it is possible to greatly reduce the conduction loss by as much as a differential quantity C1 in this embodiment. Also, compared to a case where SiC MOSFETs having the withstand voltage Vy are used in the second single-phase inverter 1, the conduction loss is increased by as much as a differential quantity C2 in this embodiment. This differential quantity C2 is however significantly smaller than the aforementioned differential quantity C1.

SiC devices are expensive compared to Si devices. In this embodiment, the expensive SiC MOSFETs 3 are used only in the first single-phase inverter 1 of which devices are required to have a high withstand voltage and the Si MOSFETs 6 are used in the second single-phase inverter 2 of which devices may have a relatively low withstand voltage. This makes it possible to effectively achieve a reduction in loss while preventing cost increase, thereby improving conversion efficiency of the power converting apparatus.

Also, because the individual single-phase inverters 1, 2 output three-level voltages, it is possible to lower the withstand voltages of the individual semiconductor devices constituting the inverters compared to an inverter which outputs two-level voltages and correspondingly reduce the conduction losses. Furthermore, as the power converting apparatus obtains a desired output voltage by combining outputs of the first single-phase inverter 1 and the second single-phase inverter 2, the power converting apparatus can perform high-frequency switching operation at low loss even with a circuit configuration operating at a high voltage exceeding 600 v, making it possible to suppress harmonics in the output voltage and produce an output voltage having a highly precise voltage waveform.

This eliminates the need for a large-capacity output filter, making it possible to obtain a compact, highly efficient power converting apparatus which is usable in high power control applications.

In the above-described first embodiment, the first and second single-phase inverters 1, 2 each include series-connected units each configured with the two series-connected MOSFETs 3, 6 with which the diodes 4, 7 are connected in reverse parallel, respectively. Each of the series-connected units configured with the two series-connected MOSFETs 3, 6 is operated by switching operation in the first and second single-phase inverters 1, 2, respectively, wherein if one of the MOSFETs is turned off, the diode connected in reverse parallel to the other one of the MOSFETs is brought to an ON state. The aforementioned other one of the MOSFETs is brought to the ON state at this time, that is, during a period from a point of completion of turn-off of the aforementioned one of the MOSFETs to a point immediately preceding the beginning of turn-on thereof. Since the MOSFETs are bidirectionally conductible when set to the ON state, a current flows in either of the aforementioned other one of the MOSFETs and the diode connected thereto in reverse parallel. For this reason, on-voltage drops, making it possible to also reduce conduction losses.

Additionally, there is formed a parasitic diode within each of the MOSFETs 3, 6, the parasitic diode being connected in the same direction as the diode 4 or 7 depicted in FIG. 1 (although such parasitic diodes of the MOSFETs are not shown in FIG. 1). Thus, it is possible to eliminate the diodes 4, 7 by using the parasitic diodes instead of the diodes 4, 7 of the first and second single-phase inverters 1, 2, respectively. This would make it possible to reduce cost needed for the diodes 4, 7 as well as device mounting areas thereof.

Second Embodiment

Next, a second embodiment of the present invention is described with reference to the drawings.

Figure 7:
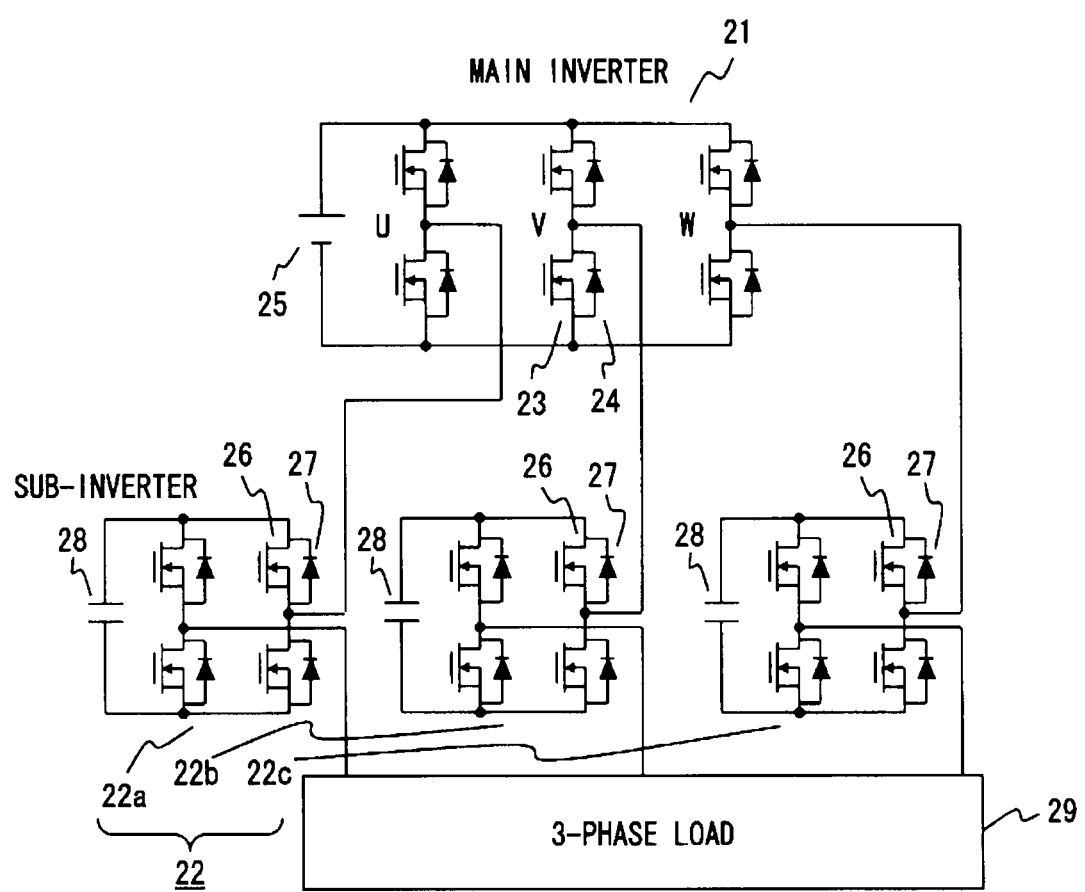
FIG. 7 is a diagram depicting the configuration of a power converting apparatus according to a second embodiment of this invention.

FIG. 7 is a diagram depicting the configuration of a power converting apparatus according to the second embodiment of this invention.

As illustrated in FIG. 7, the power converting apparatus in which AC-side output terminals of single-phase inverters 22a, 22b, 22c are series-connected to AC output lines of individual phases of a main inverter (first inverter circuit) made up of a three-phase inverter 21, respectively, supplies AC power to a three-phase load 29.

Used in the three-phase inverter 21 are such devices that are made of SiC or GaN, for example, which are non-Si wideband gap semiconductor materials. In this case, the three-phase inverter 21 includes SiC MOSFETs 23 serving as a plurality of SiC power semiconductor switching devices with which SiC diodes 24 are individually connected in reverse parallel and a DC power supply 25 serving as a first DC voltage source. The three-phase inverter 21 thus configured converts DC power fed from the DC power supply 25 into AC power and outputs the latter. The three-phase inverter 21 works as an energy source for the three-phase load 29.

Used in a sub-inverter 22 (second inverter circuit) including the three single-phase inverters 22a, 22b, 22c are devices made of silicon. In this case, each of the single-phase inverters 22a, 22b, 22c includes Si MOSFETs 26 serving as a plurality of Si power semiconductor switching devices with which Si diodes 27 are individually connected in reverse parallel and a capacitor 28 serving as a second DC voltage source. The sub-inverter 22 thus configured converts DC power fed from the capacitor 28 into AC power and outputs the latter. Since a DC input portion of each of the single-phase inverters 22a-22c is provided with the capacitor 8 alone in this case, the single-phase inverters 22a-22c are controlled such that the amounts of electricity charged into and discharged from the relevant capacitor 28 are balanced, or such that an average power burden born by each of the single-phase inverters 22a-22c becomes zero.

It is to be noted that the DC power supply 10 depicted in FIG. 2 may be used as the second DC voltage source, in which case each of the single-phase inverters 22a-22c also works as an energy source for the three-phase load 29.

Voltage Vdc-main of the DC power supply 25 of the three-phase inverter 21 is a high voltage exceeding 600 V, for example, and this voltage is set higher than voltage Vdc-sub of the capacitor 8 of each of the single-phase inverters 22a-22c.

Since the single-phase inverters 22a, 22b, 22c are connected to the AC output lines of the respective phases of the three-phase inverter 21, voltages generated by the three-phase inverter 21 and the single-phase inverters 22a, 22b, 22c are combined for the respective phases and three-phase AC power having a prescribed voltage waveform is supplied to the three-phase load 29. In this case, it is possible to generate necessary voltages as voltage values obtained by adding voltages of two of the single-phase inverters 22a-22c to voltages of the three-phase inverter 21 are made equal to or higher than a necessary maximum line-to-line voltage.

Specifically, the voltage Vdc-main of the DC power supply 25 and the voltage Vdc-sub of each capacitor 28 are set to satisfy:

Vdc-main>Vdc-sub (Vdc-main+Vdc-sub)×2≥maximum load voltage (maximum line-to-line voltage)

Also, as is the case with the foregoing first embodiment, the main inverter (three-phase inverter 21) employs SiC MOSFET devices X having a high withstand voltage Vx exceeding 600 V as the SiC MOSFETs 23 and is operated by low-frequency switching. On the other hand, each of the single-phase inverters 22a-22c of the sub-inverter 22 employs Si MOSFET devices Y having a relatively low withstand voltage Vy as the Si MOSFETs 26 and is operated by high-frequency PWM switching.

This makes it possible to reliably achieve a reduction in loss while preventing cost increase of the power converting apparatus, thereby improving conversion efficiency thereof in the same fashion as in the foregoing first embodiment.

Also, because the individual single-phase inverters 22a-22c output three-level voltages, it is possible to lower the withstand voltages of the individual semiconductor devices constituting the inverters compared to an inverter which outputs two-level voltages and correspondingly reduce the conduction losses. Furthermore, as the power converting apparatus obtains a desired output voltage by combining outputs of the three-phase inverter 21 and the single-phase inverters 22a-22c, the power converting apparatus can perform high-frequency switching operation at low loss even with a circuit configuration operating at a high voltage exceeding 600 V, making it possible to suppress harmonics in the output voltage and produce an output voltage having a highly precise voltage waveform.

This eliminates the need for a large-capacity output filter, making it possible to obtain a compact, highly efficient power converting apparatus which is usable in high power control applications.

Incidentally, while the main inverter is configured as the three-phase inverter 21 in the above-described second embodiment, the main inverter may be a multiphase inverter other than the three-phase inverter. Also, the sub-inverter 22 may be configured by connecting the plurality of single-phase inverters 22a-22c to the individual phases in series.

Third Embodiment

Next, a third embodiment of the present invention is described with reference to the drawings.

Figure 8:
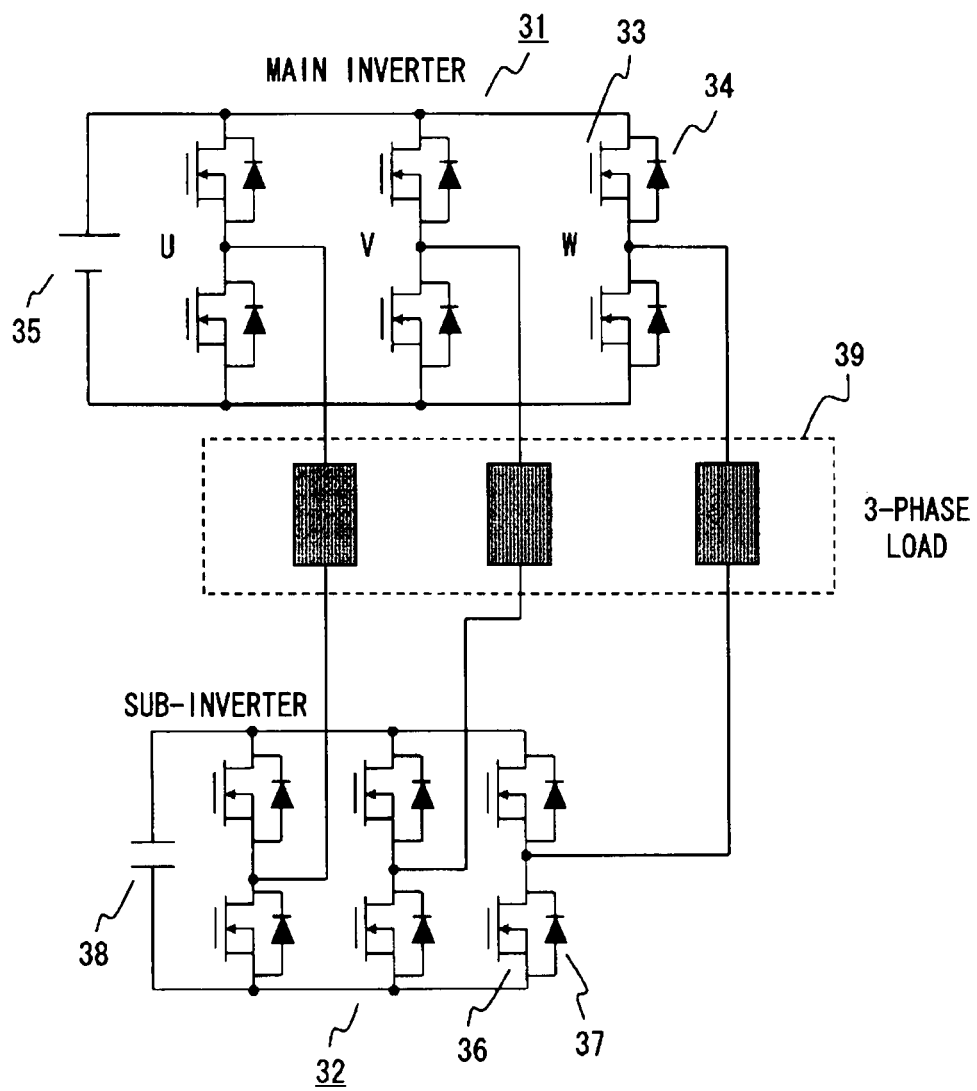
FIG. 8 is a diagram depicting the configuration of a power converting apparatus according to a third embodiment of this invention.

FIG. 8 is a diagram depicting the configuration of a power converting apparatus according to the third embodiment of this invention.

As illustrated in FIG. 8, the power converting apparatus includes a main inverter (first inverter circuit) made up of a first three-phase inverter 31 and a sub-inverter (second inverter circuit) made up of a second three-phase inverter 32 to supply AC power to a three-phase load 39. The three-phase load 39 includes, for example, coiled loads provided independently for the individual phases that are separated from one another. Also, AC output lines for the individual phases of the first three-phase inverter 31 are series-connected to AC-side output terminals for the individual phases of the second three-phase inverter 32 through the respective phases of the three-phase load 39. This means that the first and second three-phase inverters 31, 32 supply electric power to the three-phase load 39 from both sides thereof.

Used in the first three-phase inverter 31 are such devices that are made of SiC or GaN, for example, which are non-Si wideband gap semiconductor materials. In this case, the first three-phase inverter 31 includes SiC MOSFETs 33 serving as a plurality of SiC power semiconductor switching devices with which SiC diodes 34 are individually connected in reverse parallel and a DC power supply 35 serving as a first DC voltage source. The first three-phase inverter 31 thus configured converts DC power fed from the DC power supply 35 into AC power and outputs the latter. This first three-phase inverter 31 works as an energy source for the three-phase load 39.

Used in the second three-phase inverter 32 are devices made of silicon, for example. In this case, the second three-phase inverter 32 includes Si MOSFETs 36 serving as a plurality of Si power semiconductor switching devices with which Si diodes 37 are individually connected in reverse parallel and a capacitor 38 serving as a second DC voltage source. The second three-phase inverter 32 thus configured converts DC power fed from the capacitor 38 into AC power and outputs the latter. Since a DC input portion of the second three-phase inverter 32 is provided with the capacitor 38 alone in this case, the second three-phase inverter 32 is controlled such that the amounts of electricity charged into and discharged from the capacitor 38 are balanced, or such that an average power burden born by the second three-phase inverter 32 becomes zero.

It is to be noted that the DC power supply 10 depicted in FIG. 2 may be used as the second DC voltage source, in which case the second three-phase inverter 32 also works as an energy source for the three-phase load 39.

Voltage Vdc-main of the DC power supply 35 of the first three-phase inverter 31 is a high voltage exceeding 600 V, for example, and this voltage is set higher than voltage Vdc-sub of the capacitor 38 of the second three-phase inverter 32.

The power converting apparatus combines voltages generated by the first three-phase inverter 31 and the second three-phase inverter 32 for the respective phases and thereby supplies three-phase AC power having a prescribed voltage waveform to the three-phase load 39. In this case, it is possible to generate necessary voltages as voltage values obtained by adding voltages of the second three-phase inverter 32 to voltages of the first three-phase inverter 31 are made equal to or higher than a necessary maximum line-to-line voltage.

Specifically, the voltage Vdc-main of the first DC power supply 35 and the voltage Vdc-sub of the capacitor 38 are set to satisfy:

Vdc-main>Vdc-sub

Vdc-main+Vdc-sub≥maximum load voltage(maximum line-to-line voltage)

Also, as is the case with the foregoing first embodiment, the main inverter (first three-phase inverter 31) employs SiC MOSFET devices X having a high withstand voltage Vx exceeding 600 V as the SiC MOSFETs 33 and is operated by low-frequency switching. On the other hand, the sub-inverter (second three-phase inverter 32) employs Si MOSFET devices Y having a relatively low withstand voltage Vy as the Si MOSFETs 36 and is operated by high-frequency PWM switching.

This makes it possible to reliably achieve a reduction in loss while preventing cost increase of the power converting apparatus, thereby improving conversion efficiency thereof in the same fashion as in the foregoing first embodiment.

Also, as the power converting apparatus obtains a desired output voltage by combining the first and second three-phase inverters 31, 32, the power converting apparatus can perform high-frequency switching operation at low loss even with a circuit configuration operating at a high voltage exceeding 600 V, making it possible to suppress harmonics in the output voltage and produce an output voltage having a highly precise voltage waveform.

This eliminates the need for a large-capacity output filter, making it possible to obtain a compact, highly efficient power converting apparatus which is usable in high power control applications.

Also, while the three-phase power converting apparatus has been described in the present third embodiment, it is possible to substitute single-phase inverters for the first and second three-phase inverters 31, 32 and a single-phase load for the three-phase load 39, regarding the individual phases as being independent of one another. Specifically, AC-side output terminals of the single-phase inverter that serves as the main inverter may be connected to AC-side output terminals of the single-phase inverter that serves as the sub-inverter through the single-phase load so that electric power is supplied to the single-phase load from both sides thereof. It is possible to obtain the same advantageous effect in this case as well by using SiC MOSFET devices X having a high withstand voltage Vx exceeding 600 V in the main inverter and operating the same by low-frequency switching and using Si MOSFETs having a relatively low withstand voltage Vy in the sub-inverter and operating the same by high-frequency PWM switching.

Incidentally, as is the case with the earlier-described first embodiment, each of series-connected units configured with the two series-connected MOSFETs is operated by switching operation in the foregoing second and third embodiments, wherein during a period from a point of completion of turn-off of one of the MOSFETs to a point immediately preceding the beginning of turn-on thereof, the other one of the MOSFETs is brought to an ON state. As a result, a current flows in either of the aforementioned other one of the MOSFETs and the diode connected thereto in reverse parallel, causing on-voltage to drop and making it possible to reduce conduction losses.

Additionally, there is formed a parasitic diode within each of the MOSFETs in the foregoing second and third embodiments as well and, thus, it is possible to eliminate the diodes by using the parasitic diodes instead of the reverse-parallel-connected diodes. This would make it possible to reduce cost needed for the diodes as well as device mounting areas thereof.

Also, while the foregoing first to third embodiments have been described as employing the MOSFETs which are unipolar devices as the semiconductor switching devices, it is possible to employ silicon carbide insulated-gate bipolar transistors (SiC IGBTs) which are bipolar devices as devices capable of achieving a withstand voltage by far higher than 600 V at low conduction loss in each of the main inverters 1, 21, 31. As the IGBTs are conductible in one direction only, however, the IGBTs are not used in the above-described control operation performed by the MOSFETs, wherein the conduction losses are reduced during the period from the point of completion of turn-off of one of the series-connected semiconductor switching devices to the point immediately preceding the beginning of turn-on thereof by switching the aforementioned other one of the semiconductor switching devices to the ON state.

Furthermore, a preferable effect can also be obtained with such devices as bipolar transistors or gate commutated turn-off thyristors (GCTs).

While the main inverters 1, 21, 31 and the sub-inverters 2, 22, 32 are such that the main inverters 1, 21, 31 operate at a higher DC voltage and a lower switching frequency in the foregoing first to third embodiments, this configuration may be modified such that the main inverters 1, 21, 31 and the sub-inverters 2, 22, 32 operate at the same switching frequency and the main inverters 1, 21, 31 operate with a higher DC voltage, yet providing an effect of reducing overall losses.

Also, while the foregoing first to third embodiments have been discussed with reference to cases where both the semiconductor switching devices and the diodes provided in the main inverters 1, 21, 31 are devices made of non-Si, such as SiC, materials, only the semiconductor switching devices may be the non-Si devices. This makes it possible to reduce the conduction loss compared to a case of the devices made of silicon. Furthermore, only the diodes provided in the main inverters 1, 21, 31 may be devices made of a non-Si material, such as SiC SBDs. It is possible to significantly reduce losses occurring at the time of recovery of the SiC SBDs in this case as well, thereby producing a greater loss reducing effect compared to a case where the semiconductor switching devices and the diodes provided in the main inverters 1, 21, 31 are both configured with devices made of silicon.

Moreover, only the diodes provided in the sub-inverters 2, 22, 32 may be devices made of a non-Si material, such as SiC SBDs. It is possible to significantly reduce losses occurring at the time of recovery of the SiC SBDs in this case as well, thereby producing a great loss reducing effect while preventing cost increase.

Fourth Embodiment

Next, a fourth embodiment of the present invention is described.

Figure 9:
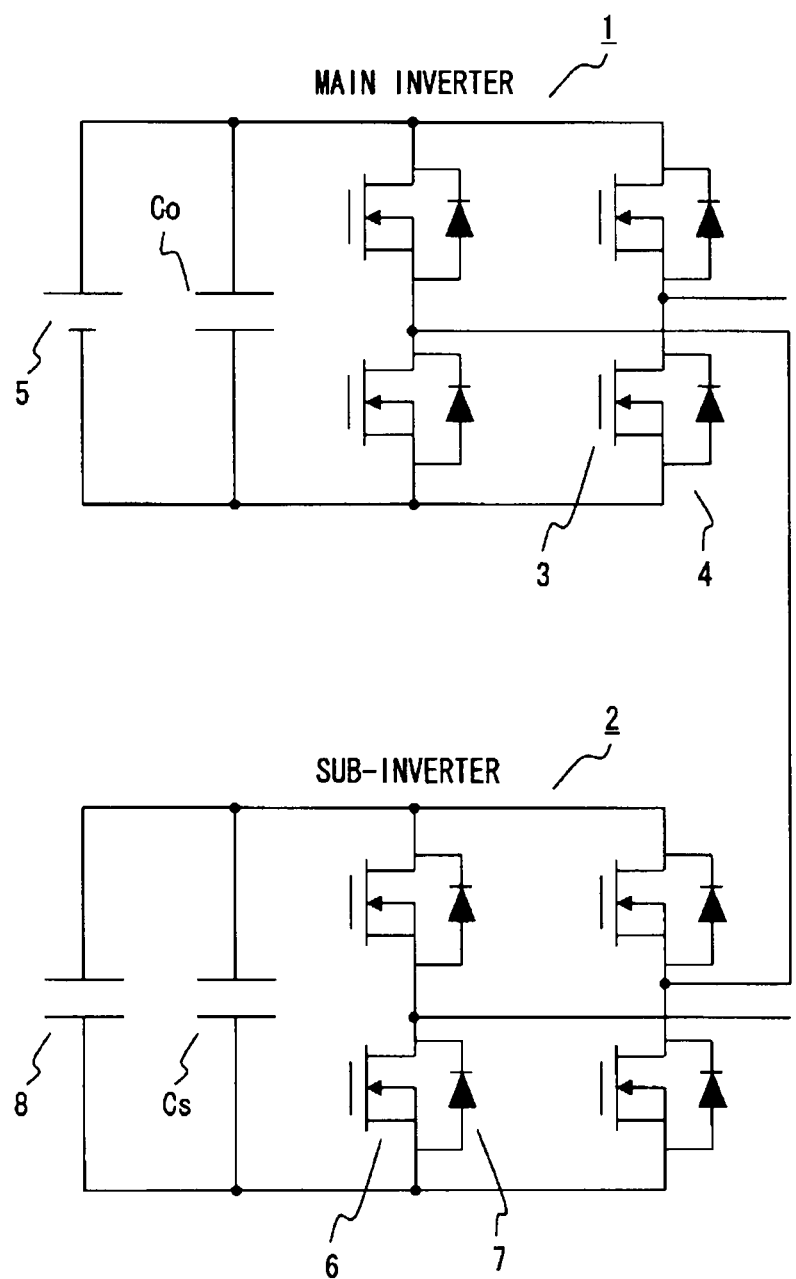
FIG. 9 is a diagram depicting the configuration of a power converting apparatus according to a fourth embodiment of this invention.

In this fourth embodiment, capacitors Co, Cs are connected between the DC power supply 5 or the capacitor 8 which are respectively the DC voltage sources of the first and second single-phase inverters 1, 2 described in the foregoing first embodiment and individual arms thereof as depicted in FIG. 9.

Since the second single-phase inverter 2 operates at a high frequency, it is necessary to increase the switching speed of each device for reducing switching losses. If wiring has a large inductance Ls in this case, there is a risk of device breakdown caused by a surge voltage induced by Ls·di/dt and, therefore, it is necessary to decrease the inductance Ls of the wiring. For this reason, the capacitor Cs connected between the capacitor 8 of the second single-phase inverter 2 and the individual arms should be a capacitor having a small inductance. Also, it is desirable to choose a capacitor having not only a small inductance but also a small impedance including a resistance component.

On the other hand, there is no need to increase the switching speed of the first single-phase inverter 1 which operates at a low frequency and, therefore, it is not necessary to take into consideration adverse effects of surge voltages. For this reason, it is not necessary that, unlike the capacitor Cs, the capacitor Co connected between the DC power supply 5 of the first single-phase inverter 1 and the individual arms be of a type having a small inductance and impedance and, thus, it is possible to use an inexpensive capacitor.

It is to be noted that, even without lowering the inductance and impedance of the capacitor Cs itself, it is possible to suppress the surge voltage by lowering the inductance and impedance of the entirety of paths from the capacitor Cs to the individual arms. Specifically, this is achieved by making the inductance and impedance of the paths from the capacitor Cs to the individual arms smaller than the inductance and impedance of paths from the capacitor Co to the individual arms.

It is possible to produce a power converting apparatus having a reliable, low-cost circuit configuration by making the inductance and impedance of the wiring from the capacitor 8 of the second single-phase inverter 2 to the individual arms smaller than the inductance and impedance of the wiring from the DC power supply 5 of the first single-phase inverter 1 to the individual arms as described above.

It is to be noted that this embodiment is applicable to the power converting apparatuses having the circuit configurations according to the foregoing second and third embodiments as well. Specifically, it is possible to produce power converting apparatuses having similarly reliable, low-cost circuit configurations by making the inductance and impedance of the wiring from the capacitor 28, 38 of the sub-inverter 22, 32 to the individual arms smaller than the inductance and impedance of the wiring from the DC power supply 25, 35 of the main inverter 21, 31 to the individual arms.

Fifth Embodiment

Next, a fifth embodiment of the present invention is described.

Figure 10:
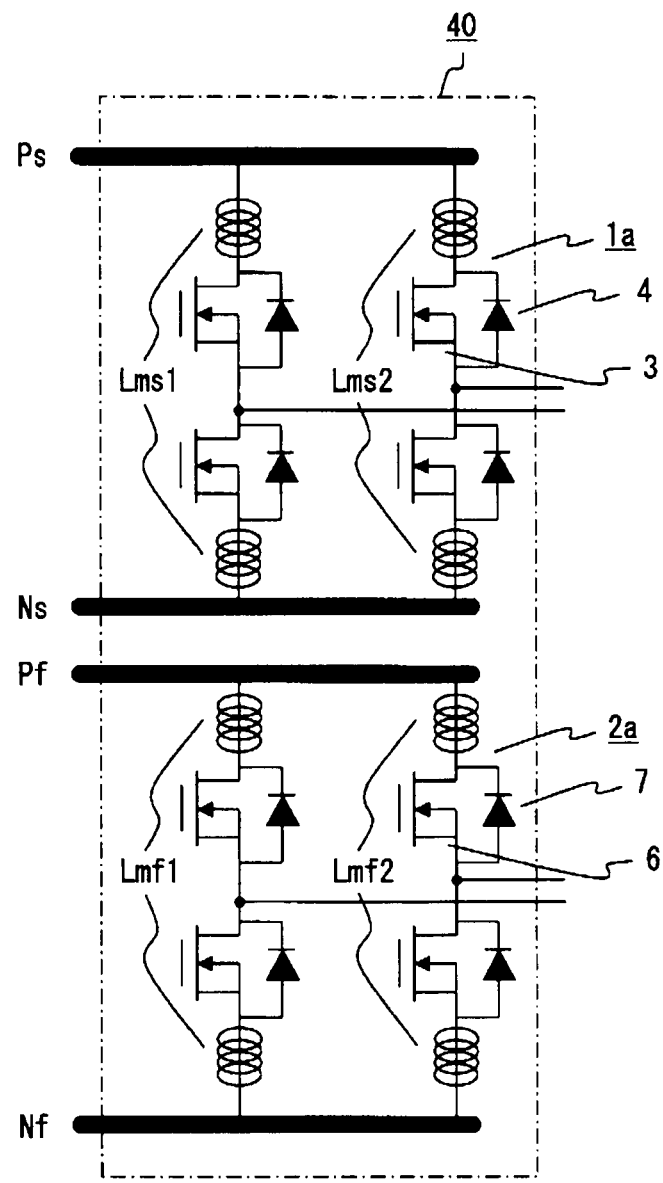
FIG. 10 is a diagram depicting the configuration of a power module according to a fifth embodiment of this invention.

In this fifth embodiment, a SiC device portion 1$a$ constituting individual arms of a first single-phase inverter 1 according to the first embodiment and a Si device portion 2$a$ constituting individual arms of a second single-phase inverter 2 are incorporated in one power module 40 as depicted in FIG. 10.

The SiC device portion 1$a$ of the first single-phase inverter 1 includes SiC MOSFETs 3 and SiC diodes 4 while the Si device portion 2$a$ of the second single-phase inverter 2 includes Si MOSFETs 6 and Si diodes 7. Here, designated by Ps and Ns are DC buses of the first single-phase inverter 1 and designated by Pf and Nf are DC buses of the second single-phase inverter 2. Also, Lms1 and Lms2 individually denote wiring inductances of two arms of the SiC device portion 1$a$ within the power module whereas Lmf1 and Lmf2 individually denote wiring inductances of two arms of the Si device portion 2$a$.

Since the Si device portion 2$a$ of the second single-phase inverter 2 operates at a high frequency, it is necessary to suppress a surge voltage induced at switching by decreasing the wiring inductances Lmf1, Lmf2. On the other hand, it is not necessary to take into consideration adverse effects of surge voltages because there is no need to increase the switching speed of the SiC device portion 1$a$ of the first single-phase inverter 1 which operates at a low frequency.

In this fifth embodiment, the individual devices and wirings are so arranged as to satisfy Lms1>Lmf1 and Lms2>Lmf2. This makes possible it to decrease the wiring inductances Lmf1, Lmf2 of the Si device portion 2$a$ with an inexpensive circuit configuration, serving to produce a reliable power converting apparatus in which surge voltages are suppressed.

Normally, devices made of different materials are not incorporated in the same power module. In the present embodiment, however, the SiC device portion 1$a$ and the Si device portion 2$a$ are incorporated in the single power module 40 with high reliability using the above-described arrangement wherein the relationships Lms1>Lmf1 and Lms2>Lmf2 are satisfied. With this arrangement, it is possible to accomplish a further size reduction of power converting apparatuses.

Figure 11:
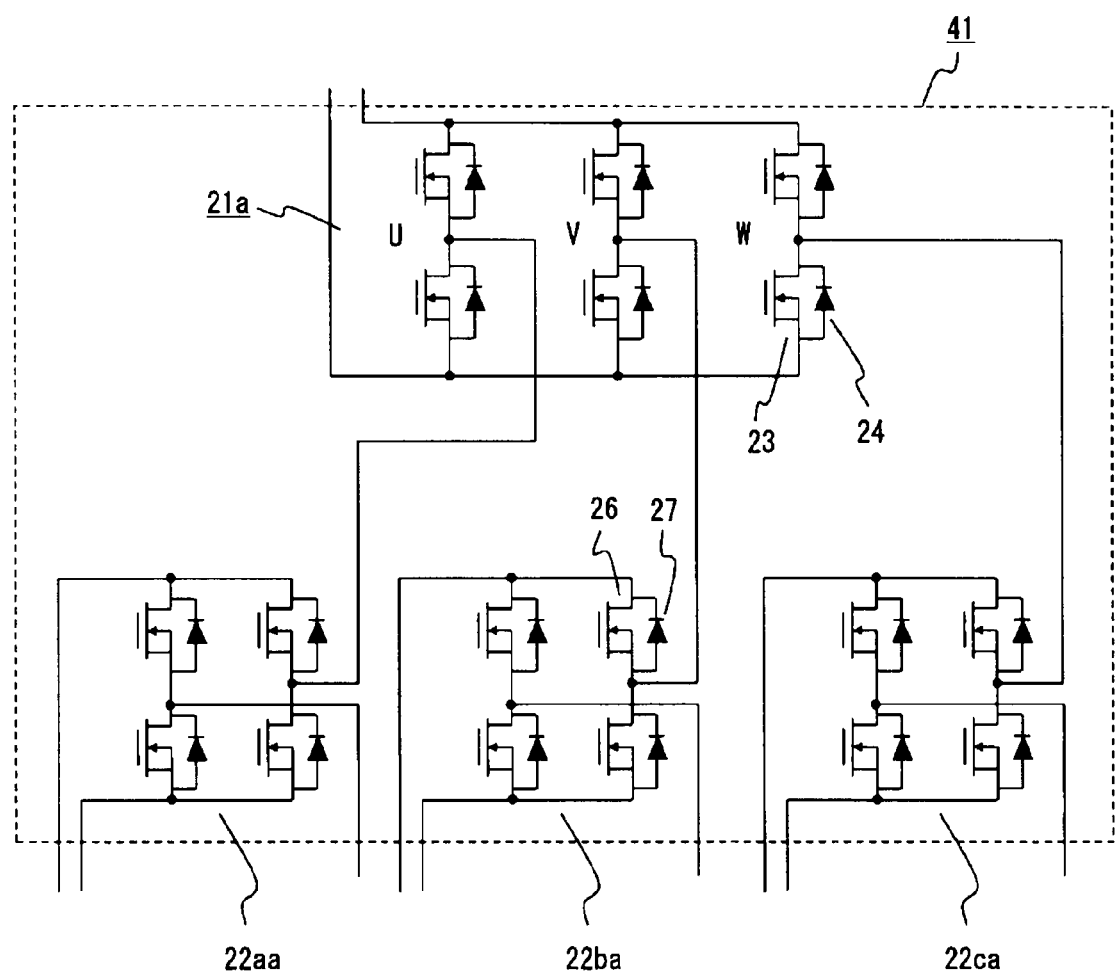
FIG. 11 is a diagram depicting the configuration of a three-phase hybrid module according to an alternative of the fifth embodiment of this invention.

Incidentally, the present embodiment is also applicable to the power converting apparatuses having the circuit configurations of the foregoing second and third embodiments. Specifically, the SiC device portion of the main inverter 21, 31 and the Si device portion of the sub-inverter 22, 32 are incorporated in a single power module with wiring inductances of the Si device portion made smaller than wiring inductances of the SiC device portion. FIG. 11 represents an arrangement in which the fifth embodiment is implemented in the foregoing second embodiment. As depicted in the Figure, a SiC device portion 21$a$ of a main inverter 21 and Si device portions 22$aa$, 22$ba$, 22$ca$ of individual single-phase inverters 22$a$, 22$b$, 22$c$ of a sub-inverter 22 are incorporated in a three-phase hybrid module 41 which constitutes a single power module.

Even when the fifth embodiment is applied to the circuit configurations of the foregoing second and third embodiments in the aforementioned manner, it is possible to produce reliable power converting apparatuses in which surge voltages are suppressed with inexpensive circuit configurations, serving also to accomplish a further size reduction of the power converting apparatuses.

The invention claimed is:

1. A power converting apparatus comprising:
   a first inverter circuit including a first DC voltage source and a plurality of semiconductor switching devices; and
   a second inverter circuit including a second DC voltage source having a lower voltage than the first DC voltage source and a plurality of semiconductor switching devices;
   wherein
   all of the semiconductor switching devices of said first inverter are wide band gap semiconductor switching devices made of semiconductor material having a wider band gap than silicon, and all of the semiconductor switching devices of said second inverter are silicon semiconductor switching devices, and
   AC-side output terminals of said first inverter circuit and AC-side output terminals of said second inverter circuit are connected in series and said power converting apparatus supplies AC power having a prescribed voltage waveform obtained by combining outputs of said first and second inverter circuits to a load.

2. The power converting apparatus according to claim 1, wherein a switching frequency used for driving said first inverter circuit is lower than a switching frequency used for driving said second inverter circuit.

3. The power converting apparatus according to claim 2, wherein only said second inverter circuit among said first and second inverter circuits is controlled by high-frequency pulse-width modulation.

4. The power converting apparatus according to claim 1, wherein each of said first inverter circuit and said second inverter circuit is configured with a single-phase inverter.

5. The power converting apparatus according to claim 1, wherein said first inverter circuit is configured with an n-phase multiphase inverter and said second inverter circuit is configured with at least n number of single-phase inverters, and wherein AC-side output terminals of the individual single-phase inverters of said second inverter circuit are connected to AC output terminals for individual phases of said first inverter circuit in series, whereby said power converting apparatus combines output voltages of said first and second inverter circuits for the individual phases and supplies n-phase AC power having the prescribed voltage waveform to an n-phase load.

6. The power converting apparatus according to claim 1, wherein said load is connected in between an AC-side output terminal of said first inverter circuit and an AC-side output terminal of said second inverter circuit, the AC-side output terminal of said first inverter circuit and the AC-side output terminal of said second inverter circuit are electrically connected to each other only through the load, and said first inverter circuit and said second inverter circuit together supply the AC power to said load from both sides thereof.

7. The power converting apparatus according to claim 1, wherein said first inverter circuit includes at least one pair of series-connected units each configured with two wide band gap semiconductor switching devices, and one of the wide band gap semiconductor switching devices of each series-connected unit is turned on during a period from a point of completion of turn-off of the other of the wide band gap semiconductor switching devices to a point immediately preceding a next turn-on action thereof.

8. The power converting apparatus according to claim 1, wherein SiC MOSFETs are used as the wide band gap semiconductor switching devices provided in said first inverter circuit.

9. The power converting apparatus according to claim 1, wherein unipolar devices are used as the wide band gap semiconductor switching devices provided in said first inverter circuit and as the silicon semiconductor switching devices provided in said second inverter circuit.

10. The power converting apparatus according to claim 1, wherein said first inverter circuit includes the plurality of semiconductor switching devices and a plurality of diodes made of semiconductor material having a wider band gap than silicon.

11. The power converting apparatus according to claim 10, wherein the plurality of diodes are SiC Schottky barrier diodes.

12. The power converting apparatus according to claim 1, wherein said second inverter circuit includes the plurality of semiconductor switching devices and a plurality of diodes made of semiconductor material having a wider band gap than silicon.

13. The power converting apparatus according to claim 1, wherein a wiring inductance between the second DC voltage source and each of the semiconductor switching devices of said second inverter circuit is smaller than a wiring inductance between the first DC voltage source and each of the semiconductor switching devices of said first inverter circuit.

14. The power converting apparatus according to claim 1, wherein the plurality of semiconductor switching devices provided in said first inverter circuit and the plurality of semiconductor switching devices provided in said second inverter circuit are incorporated in a common module.

* * * * *